(No Model.)
D. PASZTOR.
BELT FASTENER.
No. 508,970. Patented Nov. 21, 1893.
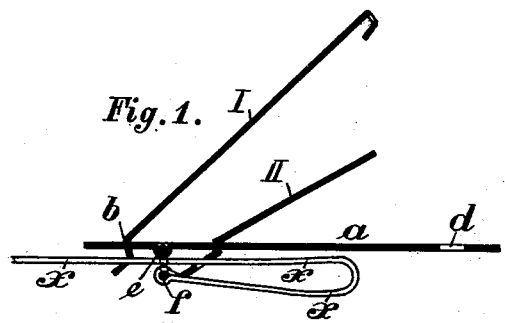
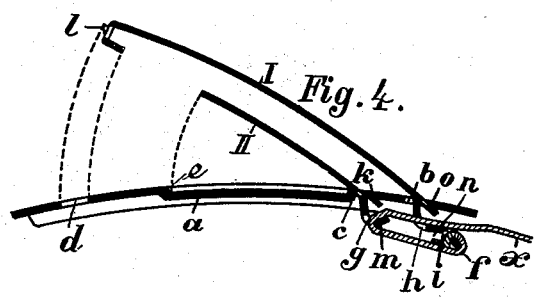
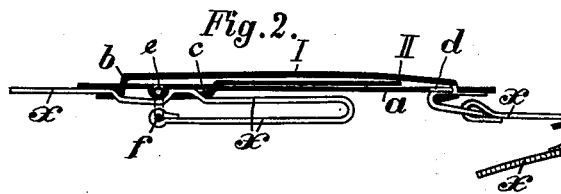
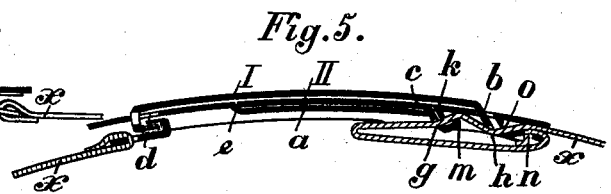
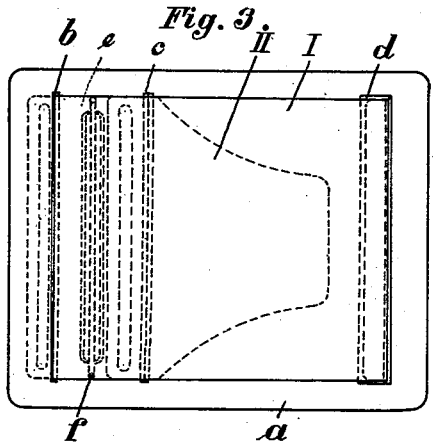
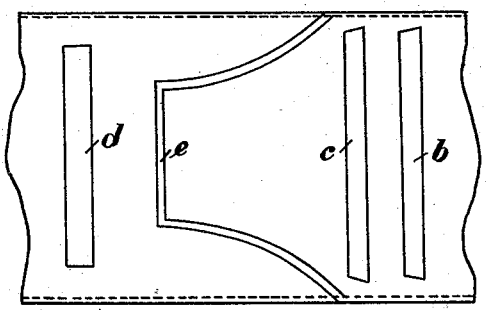

UNITED STATES PATENT OFFICE.

DAVID PÁSZTOR, OF BERLIN, GERMANY, ASSIGNOR OF ONE-HALF TO PAUL ZACHARIAS, OF SAME PLACE.

BELT-FASTENER.

SPECIFICATION forming part of Letters Patent No. 508,970, dated November 21, 1893.

Application filed May 26, 1893. Serial No. 475,640. (No model.)

*To all whom it may concern:*

Be it known that I, DAVID PÁSZTOR, of Berlin, in the Kingdom of Prussia and German Empire, have invented a new and useful Improvement in Belt-Fasteners, of which the following is a specification, reference being had therein to the accompanying drawings.

This invention has for its object to enable belts, bands or the like to be adjusted in any desired manner and the two ends buckled or fastened together without having to make or provide holes in said belts, &c., and it differs from existing devices in an advantageous manner because it obviates the drawbacks resulting from the belt being seriously injured by reason of numerous perforations and avoids rendering the belt unsightly in appearance as heretofore has usually or frequently been the case.

This invention consists of a belt fastener, clip or buckle (which for the sake of brevity I shall hereinafter refer to as a "clip") arranged, constructed and acting as follows.

In the accompanying drawings:—Figure 1 is a sectional view of a clip constructed in accordance with my invention, showing the clip partly open. Fig. 2 is a similar view showing the clip closed. Fig. 3 is a plan of the clip. Fig. 4 shows a modification, and is a sectional edge view (like Fig. 1) in the opened condition. Fig. 5 is a similar section (of same clip as Fig. 4), closed. Fig. 6 is an under side view.

The clip consists essentially, first, of a plate $a$ with the slots or apertures $b\ c\ d$ therein and having a stamped-up part or swelling $e$; second, of the plates I and II which are inserted lever fashion in $a$, and third, of the wire traverse $f$ fixed to $a$ and to which one end of the belt $x$ is fastened.

The plates I and II are bent at one end (i. e., the end inserted in plate $a$, see Fig. 1) as shown and are respectively slotted for the passage therethrough of the belt $x$. The other or free end of the plate I is bent over in the form of a hook as shown (or in other equivalent manner) and enters when depressed into the slot $d$ in plate $a$ in order to receive thereon the hook which is sewed or otherwise suitably secured to the other or free end of the belt. The plate II terminates at its free end in a straight portion and is carried down by plate I when the latter is closed down in order to grip the belt.

The action of the grip is as follows:—Assuming that one end of the belt is fastened at $f$ and that the plates I and II are inserted in the slots $b$ and $c$, then the free end of the belt is drawn through the slot in the bent end of the plate II and also through the slot in I so that a loop is formed between $f$ and the bent end of plate II until the desired adjustment is obtained; that is the required length of belt, &c., is determined. Then the plate I is pressed and caused to enter the slot $d$ of $a$, whereupon the bent ends of I and II grip the belt $x$ between them and the ridge or swelling $e$ while the hook on the other end of the belt is engaged in the hook-like bent end of the plate I in slot $d$. Thus the length of the belt can be easily adjusted and the ends joined and firmly secured.

In the modification illustrated in Figs. 4, 5 and 6 the plate $a$ is formed with a bend in the direction of its length between $a$ and $c$. A plate II$^a$ inserted lever fashion in the slot $e$ fits into said bend while the plate I$^a$, which is inserted in a similar manner in the slot $b$, covers the bottom plate $a$ and the middle plate II and is firmly locked and held in the closed position by reason of the engagement of the swelling $l$ (Figs. 4 and 5) in the slot $d$. As in the preceding described arrangement the belt $x$ is also in this case fastened at one end around $f$ by sewing and the belt is passed through the slots similarly to the preceding arrangement. The belt $x$ passes out at $b$, a slot in the plate II. When the clip is in the closed condition the belt is gripped and firmly fixed in any desired position between the bend $m$ and the swelling or projection $k$ and also by the similar gripping action between the bend $n$ and the projection $o$. This arrangement avoids the necessity of adjusting the clip while the belt is in its use—usually a very inconvenient operation—as the belt or band cannot slip because the belt can be firmly fixed and held according to my present invention before placing same in position, and it will remain securely gripped and of the determined length when I is closed according to either arrangement shown.

What I claim, and desire to secure by Letters Patent of the United States, is—

1. A clip for connecting belts comprising a main plate having a single opening at one end and two openings near the other, inner and outer plates having angular bent ends adapted to pass through said two openings, and provided with slots to permit the passage of one end of the belt therethrough, the outer plate having a hooked end adapted to be passed through the single opening and be engaged by the other end of the belt, substantially as described.

2. A clip for connecting belts comprising a main plate having a single opening at one end and two openings near the other, inner and outer plates of different length having angular bent ends passing through said two openings and slotted to permit the passage of one end of the belt, a projection from the under face of the main plate, in proximity to one of the bent ends, and a hook formed upon the end of the outer plate adapted to pass through the single opening as the clip is locked, substantially as described.

3. In a belt fastener, a main plate having a single opening at one end and two openings at the other, an inner shorter plate having an angular bent end passing through the inner opening, with a slot in said angular end an outer plate having an angular bent end passing through the outer opening with two slots in said end and having its other end provided with a hooked extension passing through the single opening, when the fastener is closed, and a slot in said hooked end, substantially as described.

4. In combination with the main plate, the plates I and II having an angular bent end passing through openings therein and having slots for the belt, the extensions $m$ and $n$ on said ends, the projections $k$ $o$ from the main plate for gripping the belt, and the projection $l$ upon the free end of the plate I adapted to engage the edge of the opening $d$, substantially as and for the purpose set forth.

In witness whereof I hereunto set my hand in presence of two witnesses.

DAVID PÁSZTOR.

Witnesses:
PAUL FISCHER,
JOHN SALOWSKY.